(12) United States Patent
Hiroe et al.

(10) Patent No.: US 7,422,681 B2
(45) Date of Patent: Sep. 9, 2008

(54) SUBSTRATE TREATING APPARATUS

(75) Inventors: Toshio Hiroe, Kyoto (JP); Tadashi Maegawa, Kyoto (JP); Yoshitaka Abiko, Kyoto (JP); Akira Morita, Kyoto (JP)

(73) Assignee: Dainippon Screen Mfg. Co., Ltd. (JP)

( * ) Notice: Subject to any disclaimer, the term of this patent is extended or adjusted under 35 U.S.C. 154(b) by 342 days.

(21) Appl. No.: 11/121,519

(22) Filed: May 4, 2005

(65) Prior Publication Data

US 2005/0258085 A1    Nov. 24, 2005

(30) Foreign Application Priority Data

| May 19, 2004 | (JP) | ............................. 2004-149100 |
| Sep. 22, 2004 | (JP) | ............................. 2004-275498 |
| Mar. 4, 2005 | (JP) | ............................. 2005-060218 |

(51) Int. Cl.
*B01J 19/12* (2006.01)
*B08B 3/14* (2006.01)

(52) U.S. Cl. ............................. 210/167.01; 210/167.31; 210/167.32; 210/181; 210/416.1; 210/748; 134/110; 134/111; 134/902

(58) Field of Classification Search ............ 210/167.01, 210/167.31, 167.32, 175, 181, 416.1, 748; 134/1.3, 10, 104.4, 110–111, 902
See application file for complete search history.

(56) References Cited

U.S. PATENT DOCUMENTS

| 3,276,458 | A | * | 10/1966 | Davis et al. ................ 134/57 R |
| 3,971,338 | A | * | 7/1976 | Alexson ...................... 119/262 |
| 4,857,204 | A | * | 8/1989 | Joklik ........................ 210/695 |
| 5,368,171 | A | * | 11/1994 | Jackson ...................... 134/147 |
| 5,549,798 | A | * | 8/1996 | Kitajima et al. ............. 204/222 |
| 5,722,442 | A | * | 3/1998 | Hoffman et al. ......... 134/102.1 |
| 5,843,309 | A | * | 12/1998 | Mancil ........................ 210/205 |
| 6,039,057 | A | * | 3/2000 | Doran ....................... 134/95.2 |
| 6,116,254 | A | * | 9/2000 | Shiramizu ................... 134/99.1 |
| 6,253,584 | B1 | * | 7/2001 | Shin ............................. 68/13 R |
| 6,267,122 | B1 | * | 7/2001 | Guldi et al. .................. 134/1.3 |
| 6,273,108 | B1 | * | 8/2001 | Bergman et al. ......... 134/102.1 |
| 6,328,884 | B1 | * | 12/2001 | Kunkel .................... 210/198.1 |
| 6,869,487 | B1 | * | 3/2005 | Bergman ........................ 134/3 |
| 2002/0020436 | A1 | * | 2/2002 | Bergman ..................... 134/30 |
| 2003/0010694 | A1 | * | 1/2003 | Holt ............................. 210/184 |

FOREIGN PATENT DOCUMENTS

| JP | 5-237499 | * | 9/1993 |
| JP | 5-304126 | | 11/1993 |
| JP | 6-275593 | * | 9/1994 |
| JP | 8-274057 | | 10/1996 |
| JP | 2000-223469 | | 8/2000 |
| JP | 2001-358134 | | 12/2001 |

* cited by examiner

*Primary Examiner*—Fred Prince
(74) *Attorney, Agent, or Firm*—Ostrolenk, Faber, Gerb & Soffen, LLP

(57) ABSTRACT

A substrate treating apparatus for treating substrates having a film coating. The apparatus includes a treating unit for treating the substrates with a treating solution, a drain pipe for draining the treating solution from the treating unit, a filter mounted on the drain pipe, and an ultraviolet emitting unit for the filter for emitting ultraviolet light to the treating solution flowing through the filter.

16 Claims, 14 Drawing Sheets

SUBSTRATE TREATING APPARATUS

BACKGROUND OF THE INVENTION (1) Field of the Invention

This invention relates to a substrate treating apparatus for performing various treatments, such as etching treatment, stripping treatment and cleaning treatment, of film-coated substrates such as semiconductor wafers or glass substrates for liquid crystal displays (hereinafter called simply substrates).

(2) Description of the Related Art

Conventionally, this type of substrate treating apparatus includes an inner tank for storing a treating solution, an outer tank for collecting the treating solution overflowing the inner tank, a circuit for circulating the treating solution from the outer tank to the inner tank, a pump mounted on the circuit, and a filter for removing particles and the like from the treating solution flowing through the circuit (see Japanese Unexamined Patent Publication No. 2001-358134 (FIG. 1), for example).

The apparatus having the above construction stores a treating solution such as hydrofluoric acid in the inner tank, and immerses substrates coated with photoresist film in the treating solution to etch portions of the substrates not masked by the photoresist film. After this treatment, a treating solution containing sulfuric acid and hydrogen peroxide solution is introduced into the inner tank, and the substrates coated with the photoresist film are immersed therein to strip off and remove the photoresist film itself.

The conventional apparatus noted above has the following drawback.

In the conventional apparatus, the filter is often clogged with the photoresist film stripped off, and must be changed frequently. As a result, an increased number of halts occur with the apparatus for filter changing operations, hence a problem of low working efficiency of the apparatus.

SUMMARY OF THE INVENTION

This invention has been made having regard to the state of the art noted above, and its object is to provide a substrate treating apparatus for preventing clogging of a filter by ultraviolet irradiation, thereby to improve its working efficiency.

The above object is fulfilled, according to this invention, by a substrate treating apparatus for treating substrates having a film coating, comprising a treating unit for treating the substrates with a treating solution; a drain pipe for draining the treating solution from the treating unit; a filter mounted on the drain pipe; and an ultraviolet emitting unit for the filter for emitting ultraviolet light to the treating solution flowing through the filter.

According to this invention, the treating solution flowing into the filter contains film particles and fragments, and the filter captures these particles and fragments. The particles and fragments are then decomposed by the ultraviolet light from the ultraviolet emitting unit. This prevents the filter from becoming clogged with the film particles and fragments. Consequently, the filter may be changed with reduced frequency, to improve the working efficiency of the apparatus.

In this invention, the filter may include a filter body having a hollow portion, an outer container surrounding the filter body, an inflow portion for admitting the treating solution at an end of the outer container, and an outflow portion communicating with the hollow portion of the filter body and for discharging the treating solution from the other end of the outer container, the ultraviolet emitting unit for the filter being disposed in one of positions between the outer container and the filter body and in the hollow portion of the filter body.

Space exits between the outer container and the filter body, and space exists also in the hollow portion of the filter body. The ultraviolet emitting unit for the filter may be disposed in one of these spaces. Thus, ultraviolet light may be emitted from a reduced distance to the filter body, without attenuation, to decompose the film particles and fragments adhering to the filter.

The ultraviolet emitting unit for the filter may be further disposed in the other of the positions between the outer container and the filter body and in the hollow portion of the filter body.

Since ultraviolet light is emitted from inside and outside the filter body, the film particles and fragments adhering to the filter are decomposed in a short time.

The apparatus according to this invention may further comprise a pump for feeding the treating solution under pressure to the treating unit, the pump including an ultraviolet emitting unit for the pump for emitting ultraviolet light to the treating solution flowing through the pump.

Where the drain pipe is in the form of a circuit for feeding the treating solution to the treating unit again, it is common practice to provide a pump upstream of the filter. Thus, ultraviolet emitting unit for the pump can decompose part of the film particles and fragments present in the treating solution upstream of the filter. Consequently, the film particles and fragments adhere in a reduced quantity to the filter, thereby shortening the decomposition time in the filter.

The pump may be a bellows pump, the ultraviolet emitting unit for the pump being disposed in an inflow portion and an outflow portion of the pump.

Although the pump has a complicated internal structure, the inflow portion and outflow portion are relatively simple in structure to allow the ultraviolet emitting unit to be arranged with ease.

The apparatus according to this invention may further comprise a heating device for heating the treating solution to be supplied to the treating unit to a predetermined temperature, the heating device including an ultraviolet emitting unit for the heating device for emitting ultraviolet light to the treating solution flowing through the heating device.

Where the apparatus is constructed to supply the treating solution heated to a high temperature to the treating unit, the heating device also is provided with an ultraviolet emitting unit for the heating device. Where the drain pipe is in the form of a circuit for feeding the treating solution to the treating unit again, it is common practice to position the heating device upstream of the filter. The ultraviolet emitting unit for the heating device emits ultraviolet light to the treating solution passing through the heating device to decompose the film particles and fragments present in the treating solution to some extent. Consequently, the film particles and fragments adhere in a reduced quantity to the filter, thereby shortening the time for decomposition in the filter by ultraviolet emitting unit for the filter.

In another aspect of the invention, a substrate treating apparatus for treating substrates having a film coating, comprises an inner tank for storing a treating solution and allowing the substrates to be immersed in the treating solution; an outer tank disposed outside the inner tank for collecting the treating solution overflowing the inner tank; a circuit for supplying the treating solution drained from the outer tank to the inner tank; a filter mounted on the circuit; and an ultraviolet emitting unit for emitting ultraviolet light to the treating solution.

According to this invention, ultraviolet light emitted to the treating solution having mixed therein the separated film in the form of particles and fragments can decompose the particles and fragments. This prevents the filter from becoming clogged with the film particles and fragments. Consequently, the filter may be changed with reduced frequency, to improve the working efficiency of the apparatus.

The ultraviolet emitting unit may be provided for the outer tank for emitting ultraviolet light to the treating solution overflowing to the outer tank.

Since ultraviolet light is emitted from the ultraviolet emitting unit in the outer tank, the treating solution flows into the circuit after the film particles and fragments in the treating solution are decomposed. This prevents the filter from becoming clogged with the film particles and fragments. Consequently, the filter may be changed with reduced frequency, to improve the working efficiency of the apparatus.

The circuit may include a mesh pipe disposed upstream of the filter, the ultraviolet emitting unit emitting ultraviolet light into the mesh pipe.

The mesh pipe captures the film particles and fragments present in the treating solution, and ultraviolet light is emitted to the mesh pipe, thereby to decompose the particles and fragments in the treating solution. This prevents the filter from becoming clogged with the film particles and fragments. Consequently, the filter may be changed with reduced frequency, to improve the working efficiency of the apparatus. Since the particles and fragments in the treating solution are captured efficiently by the mesh pipe, the film decomposition efficiency is improved.

The mesh pipe may include a plurality of meshed plates arranged in a flowing direction of the treating solution, the ultraviolet emitting unit being disposed around the mesh pipe.

The ultraviolet emitting unit emits ultraviolet light to the treating solution slowed down by the meshed plates arranged in the flowing direction of the treating solution. This reliably decomposes the film particles and fragments present in the treating solution.

In this invention, the circuit may include a meandering pipe disposed upstream of the filter, the ultraviolet emitting unit emitting ultraviolet light into the meandering pipe.

By passing the treating solution through the meandering pipe defining an extended channel, ultraviolet light can irradiate the treating solution with the film particles and fragments mixed therein over an extended time. Thus, the film particles and fragments present in the treating solution can be decomposed efficiently. This prevents the filter from becoming clogged with the film particles and fragments. Consequently, the filter may be changed with reduced frequency, to improve the working efficiency of the apparatus. The meandering pipe does not greatly increase channel resistance, and has little influence on the flow through the circuit.

The ultraviolet emitting unit may be provided for the inner tank for emitting ultraviolet light to the treating solution in the inner tank.

By emitting ultraviolet light to the inner tank, the film particles and fragments present in the treating solution may be decomposed. This prevents the filter from becoming clogged with the film particles and fragments. Consequently, the filter may be changed with reduced frequency, to improve the working efficiency of the apparatus. Since the substrates placed in the inner tank are also irradiated with ultraviolet light, not only are the film particles and fragments present in the treating solution decomposed, but the irradiation helps to decompose directly the film coating the substrates. Thus, the film removing treatment of the substrates may be carried out in a reduced time.

The circuit may include a trap pipe connected to a position thereof upstream of the filter, the ultraviolet emitting unit emitting ultraviolet light to the treating solution in the trap pipe.

The film particles and fragments present in the treating solution precipitate to be captured in the trap pipe, and may be decomposed by emitting ultraviolet light to the trap pipe. This prevents the filter from becoming clogged with the film particles and fragments. Consequently, the filter may be changed with reduced frequency, to improve the working efficiency of the apparatus. This effect is produced by the simple construction requiring only the trap pipe.

Further, the circuit may include a trap device disposed upstream of the filter, the ultraviolet emitting unit emitting ultraviolet light to the treating solution in the trap device, the trap device including a storage tank for storing the treating solution, the storage tank having an inflow portion connected to an upstream position of the circuit, and an outflow portion connected to a downstream position of the circuit.

The film particles and fragments present in the treating solution precipitate to be captured in the storage tank, and may be decomposed by emitting ultraviolet light to the storage tank. This prevents the filter from becoming clogged with the film particles and fragments. Consequently, the filter may be changed with reduced frequency, to improve the working efficiency of the apparatus. This effect is produced by the simple construction requiring only the trap device.

The trap device may further include a partition dividing the inflow portion and the outflow portion such that the inflow portion has a larger capacity than the outflow portion, and defining meshes in a channel distant from the inflow portion, and an irradiated portion disposed below the meshes of the partition and irradiated by ultraviolet light from the ultraviolet emitting unit When the treating solution flowing into the storage tank through the inflow portion passes through the meshes of the partition, the film particles and fragments are captured and settle in the irradiated portion. The treating solution filtered through the meshes returns to the circuit via the outflow portion. Thus, by emitting ultraviolet light to the irradiated portion, the film particles and fragments present in the treating solution may be decomposed efficiently.

Further, the circuit may include a centrifugal separator disposed upstream of the filter for centrifugally separating the treating solution, the ultraviolet emitting unit emitting ultraviolet light into the centrifugal separator.

The centrifugal separator separates and captures the film particles and fragments present in the treating solution. The film particles and fragments present in the treating solution are decomposed by emitting ultraviolet light into the centrifugal separator. This prevents the filter from becoming clogged with the film particles and fragments. Consequently, the filter may be changed with reduced frequency, to improve the working efficiency of the apparatus.

The centrifugal separator may include a container, a central channel formed in the container and communicating with the circuit, a storage portion formed around the central channel, and a screw coil disposed in an upstream position of the central channel.

As the treating solution passes through the screw coil, the film particles and fragments present in the treating solution are diverted from the central channel into the storage portion. This relatively simple construction can relatively accurately separate and decompose the film particles and fragments present in the treating solution.

BRIEF DESCRIPTION OF THE DRAWINGS

For the purpose of illustrating the invention, there are shown in the drawings several forms which are presently preferred, it being understood, however, that the invention is not limited to the precise arrangement and instrumentalities shown.

DESCRIPTION OF THE PREFERRED EMBODIMENTS

Embodiment 1

Embodiment 1 of this invention will be described hereinafter with reference to the drawings.

Figure 1:
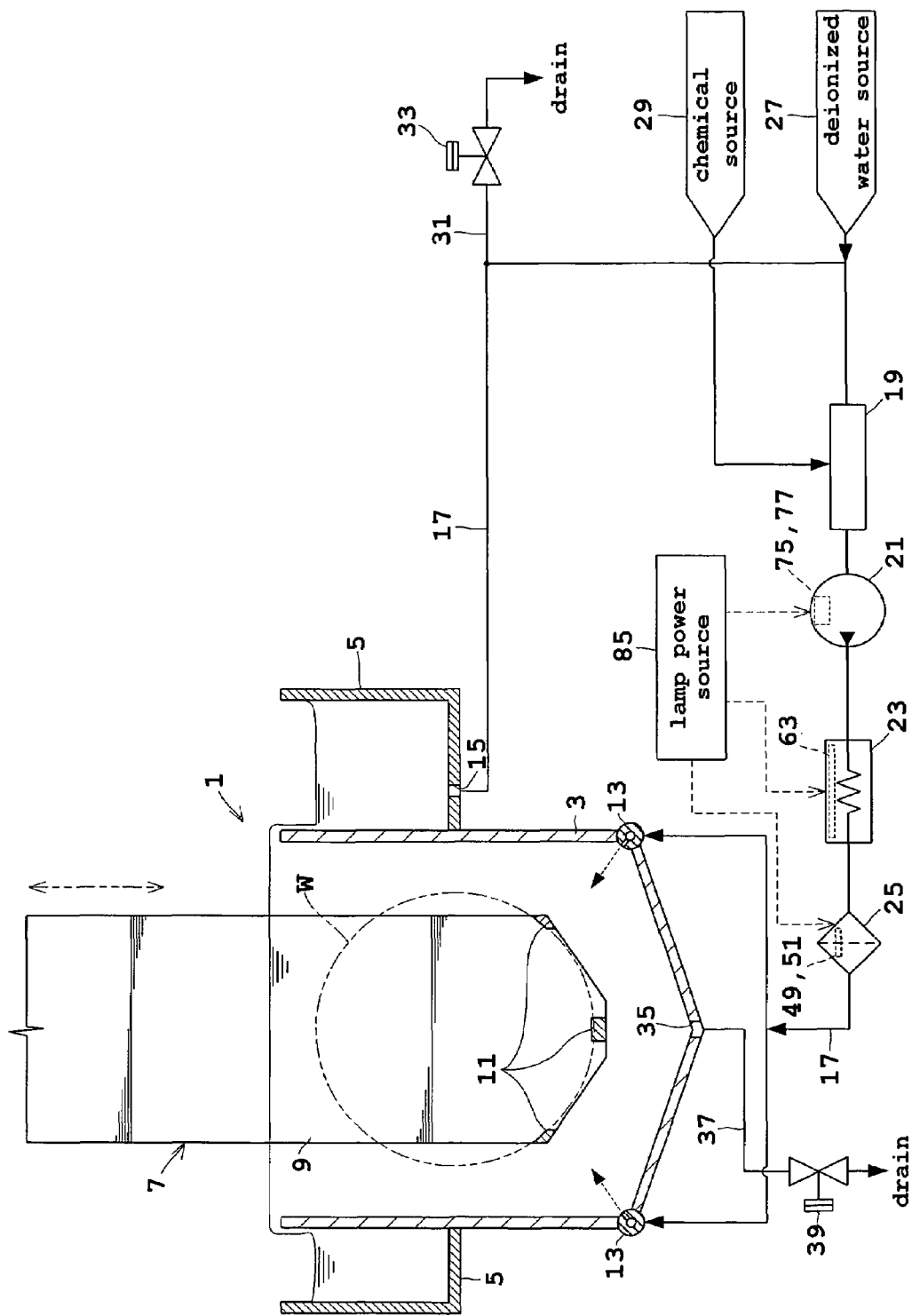
FIG. 1 is a block diagram showing an outline of a substrate treating apparatus in Embodiment 1.

FIG. 1 is a block diagram showing an outline of a substrate treating apparatus in Embodiment 1.

A treating tank 1, which corresponds to the treating unit in this invention, includes an inner tank 3 for storing a treating solution containing sulfuric acid ($H_2SO_4$) and hydrogen peroxide solution ($H_2O_2$), and an outer tank 5 disposed around the inner tank 3 for collecting the treating solution overflowing the inner tank 3. Circular wafers W under treatment are supported by a holding mechanism 7 vertically movable between a treating position inside the inner tank 3 and a standby position above the inner tank 3. The holding mechanism 7 includes a back plate 9, and support elements 11 attached to lower positions of the back plate 9 and extending perpendicular to the plane of FIG. 1. Thus, the holding mechanism 7 is constructed for holding a plurality of wafers W at a time. The wafers W have surfaces thereof coated with photoresist film, for example.

The inner tank 3 includes filling pipes 13 arranged at opposite sides in the bottom thereof. The filling pipes 13 are in communication with a drain port 15 formed in the outer tank 5, through a circuit 17. The circuit 17 includes a mixing valve 19, a pump 21, an in-line heater 23 and a filter 25 arranged in order from upstream to downstream. A deionized water source 27 is connected to the circuit 17 upstream of the mixing valve 19, while a chemical source 29 is connected to an input of the mixing valve 19. Although only one chemical source 29 is shown in this embodiment, usually, a plurality of different chemicals are provided for connection to the input of the mixing valve 19. One chemical source 29 is illustrated in this embodiment for simplicity of description.

A drain pipe 31 branches from the circuit 17 upstream of the mixing valve 19. The drain pipe 31 has a switch valve 33 mounted thereon. By opening this switch valve 33, the treating solution is drained from the outer tank 5 and circuit 17. The inner tank 3 has a drain port 35 formed in the bottom thereof. A drain pipe 37 is connected to the drain port 35, and this pipe 37 has a further switch valve 39 mounted thereon.

The substrate treating apparatus having the above construction removes the photoresist film from the wafers W as follows, for example. The switch valves 33 and 39 are closed during a film removing operation.

The mixing valve 19 forms the treating solution containing sulfuric acid and hydrogen peroxide solution. The pump 21 is operated to supply the treating solution to the inner tank 3 through the circuit 17 and filling pipes 13. The treating solution overflowing the inner tank 3 is collected in the outer tank 5 and returned to the inner tank 3 through the circuit 17 and filling pipes 13. At this time, the in-line heater 23 is operated, as necessary, to heat the treating solution to a predetermined temperature. When the treating solution has reached the predetermined temperature, the wafers W (coated with photoresist film) supported by the holding mechanism 7 are lowered to the treating position inside the inner tank 3. The photoresist film formed on the wafers W is separated therefrom by the treating solution, and mixes into the treating solution. The treating solution mixed with particles and fragments of the photoresist film stripped off overflows to the outer tank 5 to be supplied again to the inner tank 3 through the circuit 17. Upon lapse of a predetermined time, the switch valve 39 is opened to drain the treating solution from the inner tank 3, and deionized water is supplied from the deionized water source 27 to the inner tank 3 through the circuit 7 and filling pipes 13 to clean the wafers W of the treating solution adhering thereto.

In this substrate treating apparatus for treating the wafers W as described above, the following contrivances are applied to the filter 25, in-line heater 23 and the pump 21.

Figure 2:
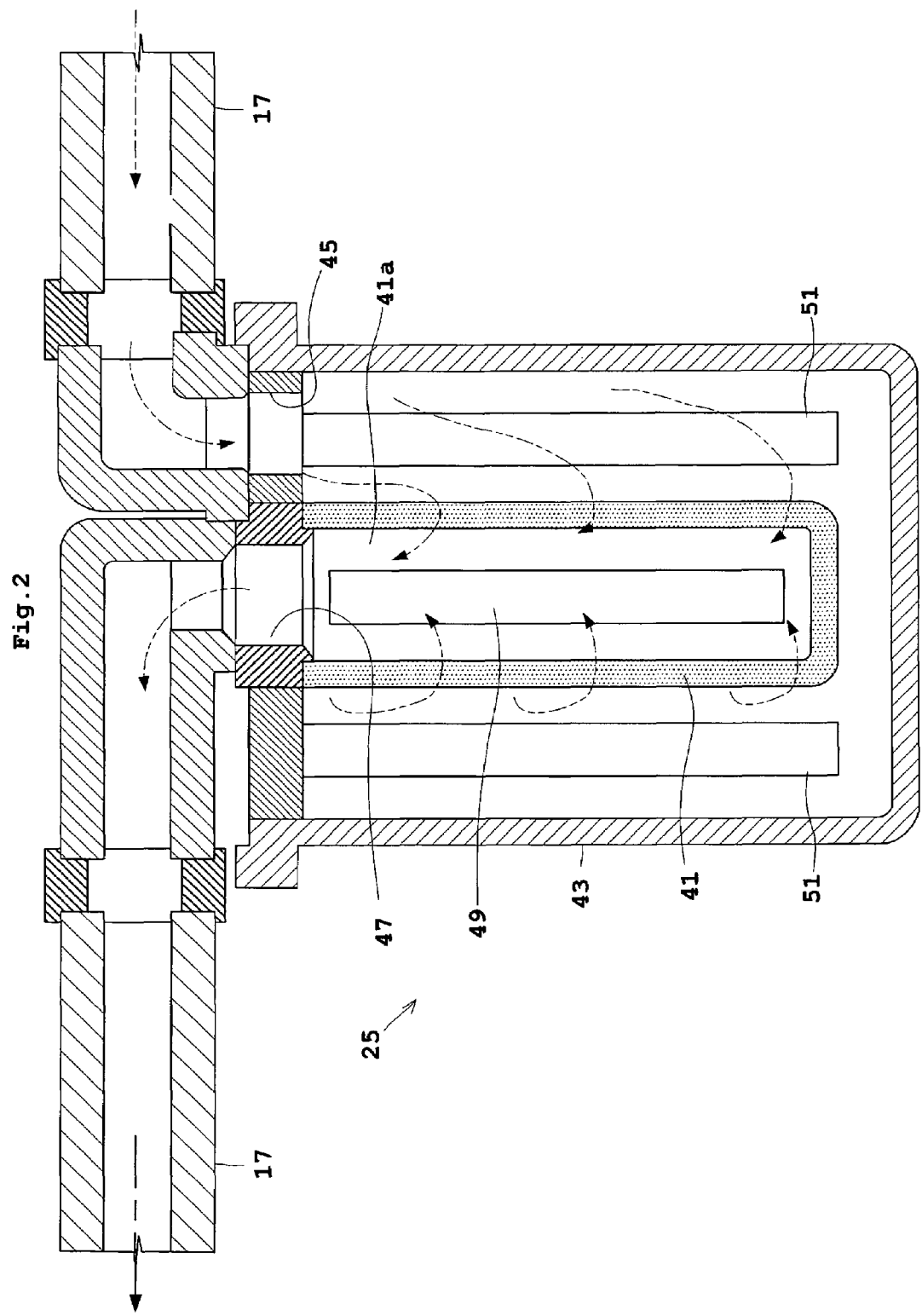
FIG. 2 is a view in vertical section showing a construction of a filter.

Reference is now made to FIG. 2. FIG. 2 is a view in vertical section of the filter 25.

The filter 25 includes a filter body 41 having a hollow portion 41a, an outer container 43 surrounding the filter body 41, an inflow portion 45 disposed at an end of the outer container 43 and communicating with the circuit 17, and an outflow portion 47 communicating with the hollow portion 41a for discharging the treating solution from the other end of the outer container 43. The filter body 41 is closed at one of opposite ends of the hollow portion 41a, and communicates at the other, open end with the outflow portion 47. As seen in plan, the filter body 41 is disposed centrally of the outer container 43.

One UV lamp 49 (ultraviolet emitting unit for the filter) is disposed in the hollow portion 41a of the filter body 41. A plurality of UV lamps 51 are arranged between the filter body 41 and outer container 43. The UV lamp 49 has a length and a diameter not obstructive to flows of the treating solution in the hollow portion 41a of the filter body 41. The UV lamps 51 (ultraviolet emitting unit for the filter) are provided in a number not obstructive to flows of the treating solution between the outer container 43 and the filter body 41, and are arranged at intervals not adversely influencing the flows.

A UV lamp of the filter 25 may be disposed only in the hollow portion 41a of the filter body 41, or UV lamps may be arranged only between the filter body 41 and the outer container 43. Where the outer container 43 is formed of an ultraviolet transmitting material, UV lamps may be arranged outside the outer container 43.

Figure 3:
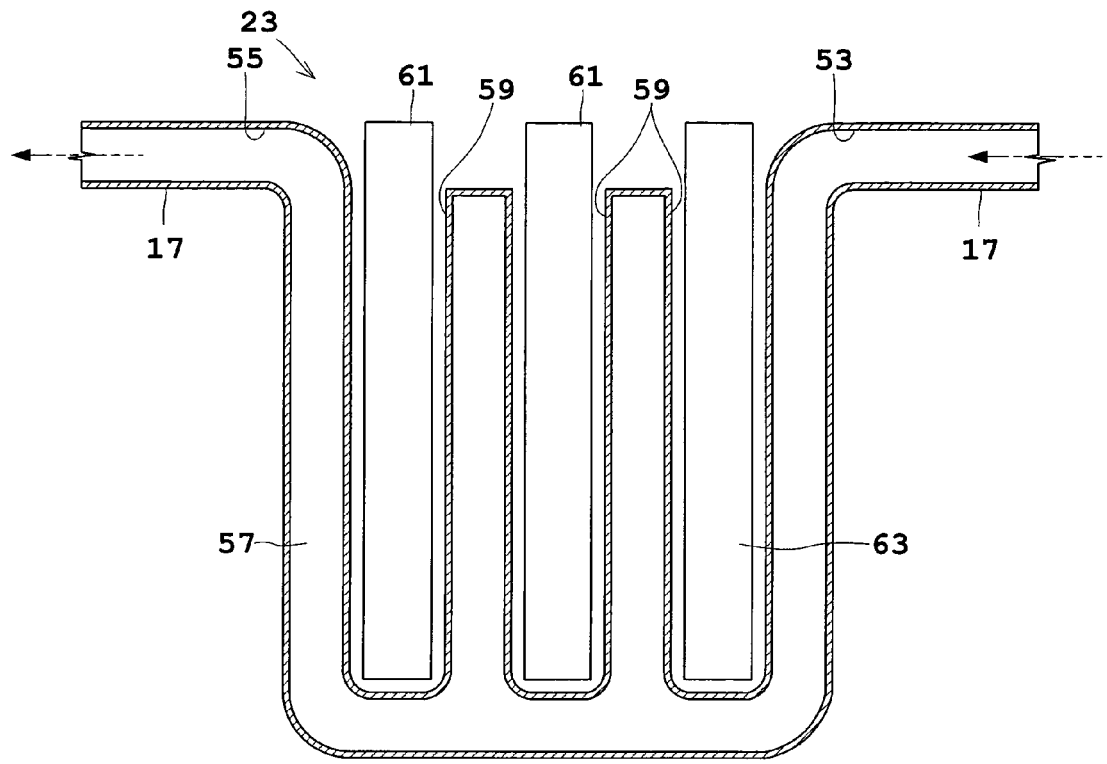
FIG. 3 is a view in vertical section of an in-line heater.
Figure 4:
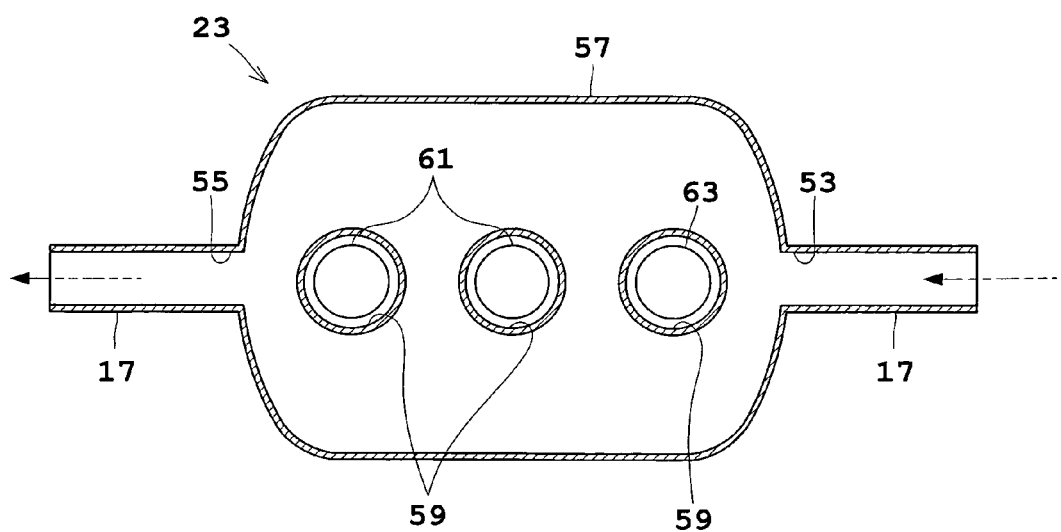
FIG. 4 is a view in cross section of the in-line heater.

Next, reference is made to FIGS. 3 and 4. FIG. 3 is a view in vertical section of the in-line heater 23. FIG. 4 is a view in cross section of the in-line heater 23.

The in-line heater 23, which corresponds to the heating device in this invention, includes a connecting portion 53 connected to an upstream side of the circuit 17, a connecting portion 55 connected to a downstream side of the circuit 17, a heating channel 57 communicating with these connecting portions 53 and 55 and formed zigzag, and mounting recesses 59 formed in the heating channel 57 for receiving heat lamps. Three mounting recesses 59 are formed in the illustrated example. Halogen lamps 61 for heating are mounted in two of the recesses 59, and a UV lamp 63 (ultraviolet emitting unit for the heating device) is mounted in the one remaining recess 59. Where a relatively low heating temperature is required, or where the halogen lamps 61 for heating are of high heating power, such halogen lamp 61 may be mounted in one recess 59, and UV lamps 63 mounted in the two remaining recesses 59.

Where the in-line heater 23 is formed of an ultraviolet transmitting material, UV lamps may be arranged outside the in-line heater 23.

Figure 5:
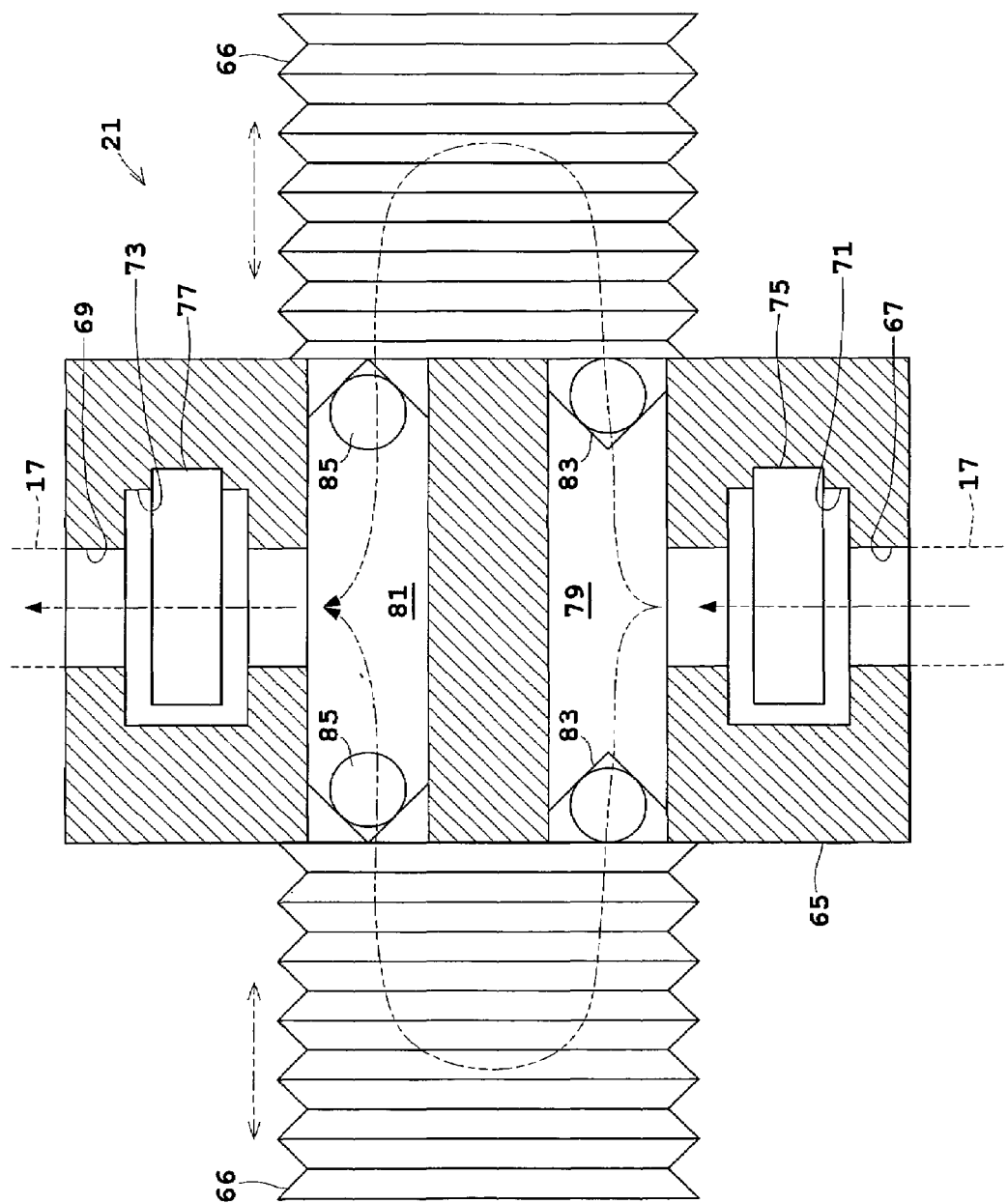
FIG. 5 is a sectional view showing an outline of a pump.

Next, reference is made to FIG. 5. FIG. 5 is a sectional view showing an outline of the pump 21.

This pump 21 is a bellows pump having a pair of bellows 66 attached to a pump frame 65 to be expansible and contractible by an actuator not shown. The pump frame 65 includes an inflow portion 67 communicating with an upstream side of the circuit 17, and an outflow portion 69 communicating with a downstream side of the circuit 17. The inflow portion 67 and outflow portion 69 include irradiating sections 71 and 73, respectively. UV lamps 75 and 77 (ultraviolet emitting unit for the pump) are arranged in the respective irradiating sections 71 and 73. A suction passage 79 communicating with the bellows 66 is formed adjacent the inflow portion 67, while a discharge passage 81 communicating with the bellows 66 is formed adjacent the outflow portion 69. Check valves 83 are arranged between the suction passage 79 and bellows 66. These check valves 83, while permitting the treating solution to flow from the inflow portion 67 into the bellows 66, stop the treating solution returning from the bellows 66 to the suction passage 79. Further, check valves 85 are arranged between the discharge passage 81 and bellows 66. These check valves 85, while permitting the treating solution to flow from the bellows 66 into the discharge passage 81, stop the treating solution returning from the discharge passage 81 to the bellows 66.

The UV lamps 49, 51, 63, 75 and 77 described above are connected to a lamp power source 85 for supplying necessary electric power. The ultraviolet light emitted from the respective UV lamps 49, 51, 63, 75 and 77, preferably, is in a wavelength range of 100 to 400 nm, for example, to dissolve or decompose easily the photoresist film formed on the wafers W and particles and fragments of the film mixed into the treating solution.

The substrate treating apparatus having the above construction removes the film from the wafers W as described hereinbefore. Thus, the treating solution flowing into the filter 25 contains particles and fragments of the film stripped off in the treating tank 1. The filter body 41 captures these particles and fragments. The particles and fragments are then decomposed by the ultraviolet light form the UV lamps 49 and 51. This prevents the filter 25 from becoming clogged with the film particles and fragments. Consequently, the filter 25 may be changed with reduced frequency, to improve the working efficiency of the apparatus.

Space exits between the outer container 43 and the filter body 41, and space exists also in the hollow portion 41a of the filter body 41. With the UV lamps 49 and 51 arranged in these spaces, ultraviolet light may be emitted from reduced distances to the filter body 41. Thus, ultraviolet light can, without attenuation, irradiate the film particles and fragments adhering to the filter body 41, thereby decomposing the particles and fragments efficiently. Moreover, since ultraviolet light is emitted from inside and outside the hollow portion 41a of the filter body 41, the film particles and fragments adhering to the filter body 41 are decomposed in a short time.

The pump 21 also includes the UV lamps 75 and 77. As in common practice, the pump 21 is disposed upstream of the filter 25. Thus, part of the particles and fragments of the photoresist film mixed into the treating solution may be decomposed upstream of the filter 25. Consequently, the film particles and fragments adhere in a reduced quantity to the filter 25, thereby shortening the decomposition time in the filter 25. Although the pump 21 has a complicated internal structure, the inflow portion 67 and outflow portion 69 are relatively simple in structure to allow the UV lamps 75 and 77 to be arranged with ease.

The apparatus in this embodiment includes also the UV lamp 63 in the in-line heater 23 for heating the treating solution flowing through the circuit 17. As in common practice, the in-line heater 23 is disposed upstream of the filter 25. Thus, by emitting ultraviolet light to the treating solution passing through the in-line heater 23, the particles and fragments of the photoresist film present in the treating solution may be decomposed to some extent. Consequently, the film particles and fragments adhere in a reduced quantity to the filter 25, thereby shortening the time for decomposition by the UV lamps in the filter 25.

The apparatus described above employs the construction for performing ultraviolet irradiation at the in-line heater 23 and pump 21 as well as at the filter 25. By employing a construction for performing ultraviolet irradiation at least at the filter 25, clogging of the filter 25 with the film particles and fragments may be prevented, so that the filter 25 may be changed with reduced frequency to improve the working efficiency of the apparatus.

Further, the above substrate treating apparatus employs the construction for circulating the treating solution. Instead of circulating the treating solution overflowing to the outer tank 5, the solution may be drained after being passed through the filter 25. In this case also, the inconvenience relating to the filter 25 may be avoided by constructing the filter 25 as described hereinbefore.

Embodiment 2

Figure 6:
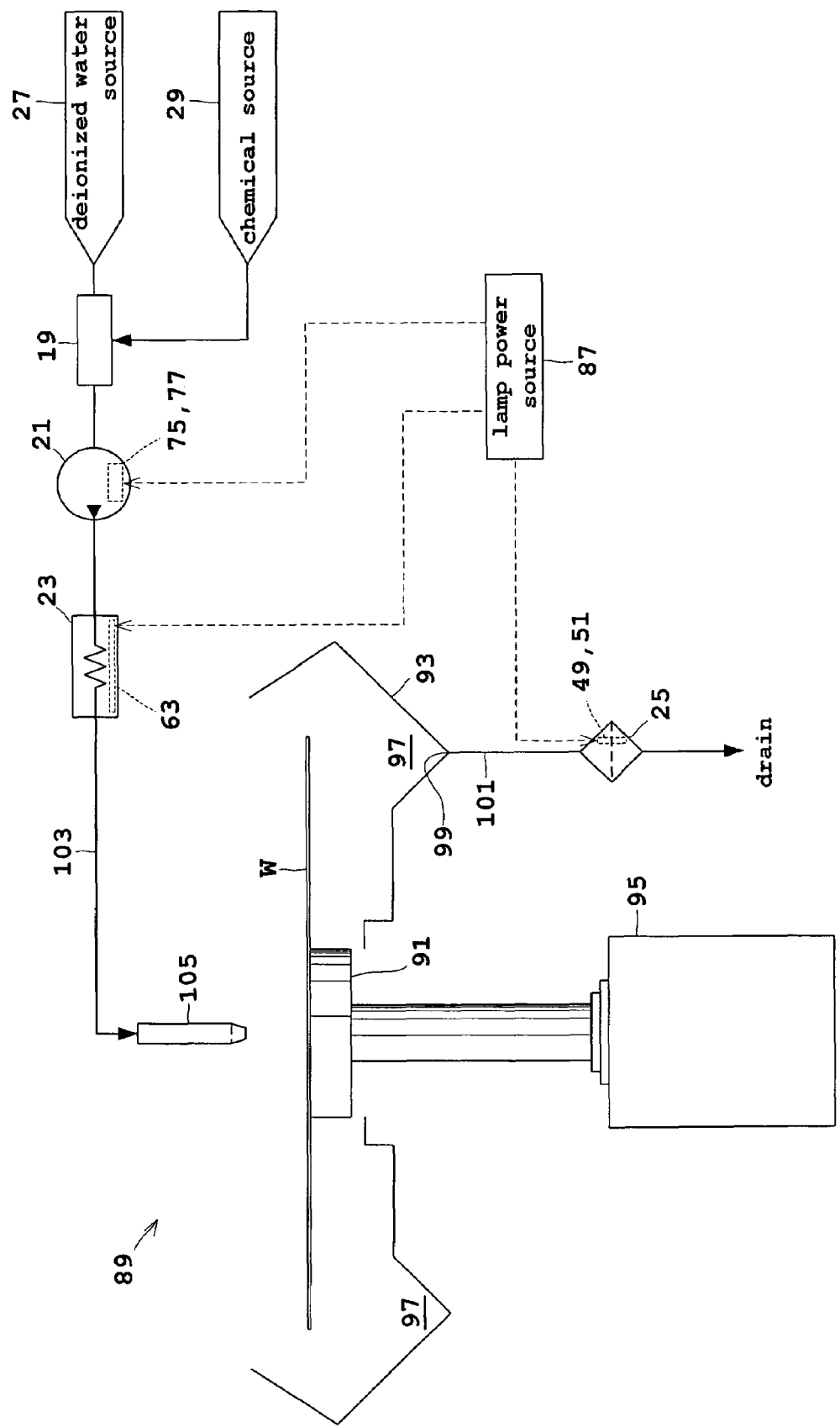
FIG. 6 is a block diagram showing an outline of a substrate treating apparatus in Embodiment 2.

Embodiment 2 of the invention will be described hereinafter with reference to FIG. 6 of the drawings. Like reference numerals will be used to identify like parts which are the same as in Embodiment 1, and will not be described again. FIG. 6 is a block diagram showing an outline of a substrate treating apparatus in Embodiment 2.

The substrate treating apparatus in Embodiment 1 described above is the batch type that treats a plurality of wafers W at a time. The substrate treating apparatus in Embodiment 2 is the single-substrate type that treats one wafer W at a time.

A treating unit 89 in this substrate treating apparatus includes a chuck 91 for holding a wafer W in horizontal posture by suction, and a scatter preventive cup 93 surrounding the chuck 91. The chuck 91 is connected at the bottom thereof to a rotary shaft of a rotary motor 95. The scatter preventive cup 93 includes a drain zone 97 shaped annular in plan view, and defining a drain port 99. The drain port 99 is in communication with a drain pipe 101 having a filter 25 mounted thereon.

A deionized water source 27 is connected a nozzle 105 through supply piping 103. The supply piping 103 has a mixing valve 19, a pump 21 and an in-line heater 23 arranged thereon in a direction from the deionized water source 27 to the nozzle 105.

Each of the pump 21, in-line heater 23 and filter 25 has an ultraviolet emitting mechanism as in Embodiment 1. Thus, organic matter is removed from the treating solution to supply a clean treating solution to the wafer W. Organic matter such as photoresist film mixed into the treating solution is prevented from clogging the filter 25. As in Embodiment 1 described hereinbefore, UV lamps 49 and 51 (ultraviolet emitting unit for the filter) may be provided for the filter 25 only, with no lamps provided for the pump 21 or in-line heater 23.

Embodiment 3

Embodiment 3 of the invention will be described hereinafter with reference to FIG. 7 of the drawings.

Figure 7:
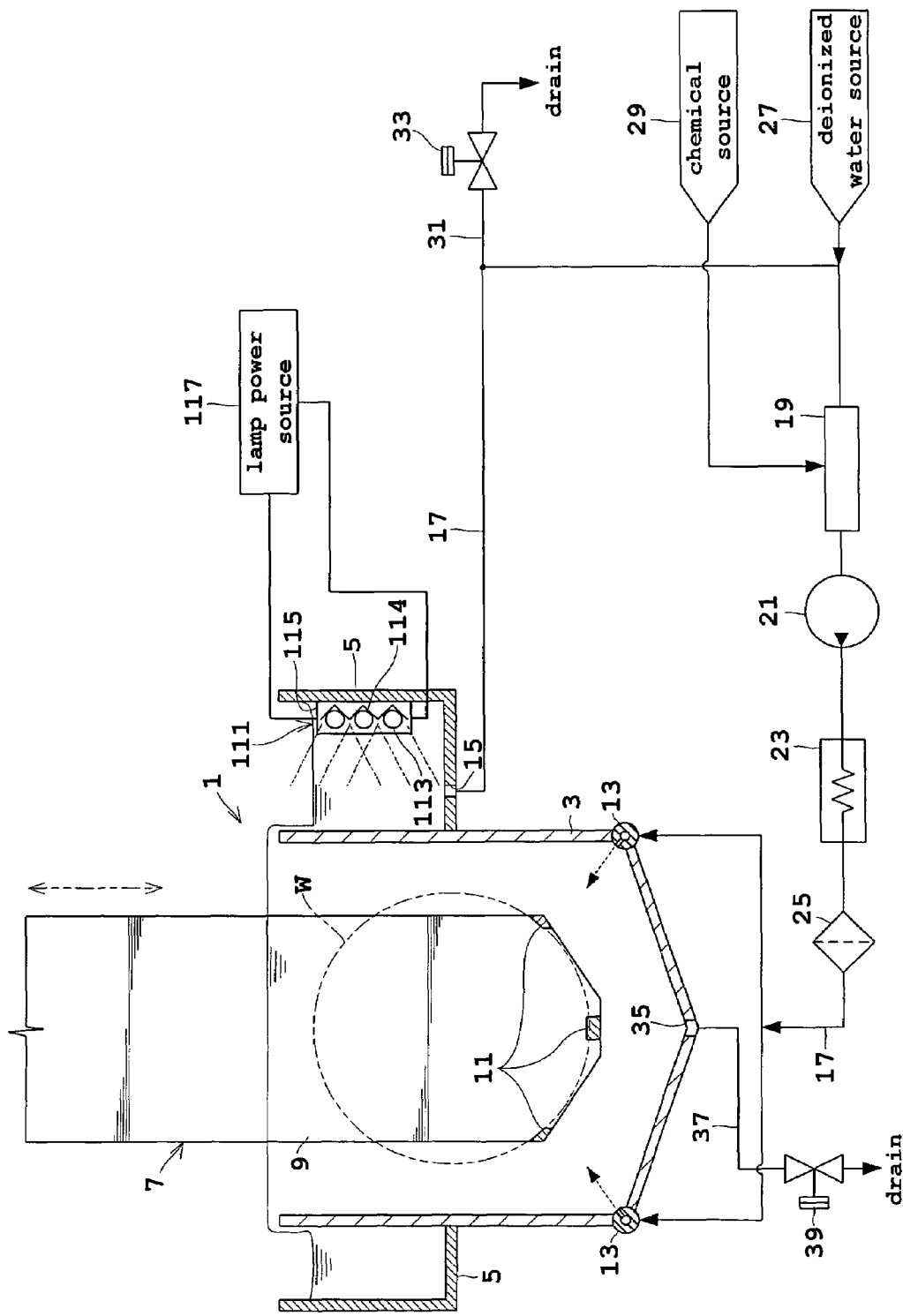
FIG. 7 is a block diagram showing an outline of a substrate treating apparatus in Embodiment 3.

FIG. 7 is a block diagram showing an outline of a substrate treating apparatus in Embodiment 3.

A treating tank 1 includes an inner tank 3 for storing a treating solution containing sulfuric acid and hydrogen peroxide solution, and an outer tank 5 disposed around the inner tank 3 for collecting the treating solution overflowing the inner tank 3. Circular wafers W under treatment are supported by a holding mechanism 7 vertically movable between a treating position inside the inner tank 3 and a standby position above the inner tank 3. The holding mechanism 7 includes a back plate 9, and support elements 11 attached to lower positions of the back plate 9 and extending perpendicular to the plane of FIG. 7. Thus, the holding mechanism 7 is constructed for holding a plurality of wafers W at a time. The wafers W have surfaces thereof coated with photoresist film, for example.

The inner tank 3 includes filling pipes 13 arranged at opposite sides in the bottom thereof. The filling pipes 13 are in communication with a drain port 15 formed in the outer tank 5, through a circuit 17. The circuit 17 includes a mixing valve 19, a pump 21, an in-line heater 23 and a filter 25 arranged in order from upstream to downstream. A deionized water source 27 is connected to the circuit 17 upstream of the mixing valve 19, while a chemical source 29 is connected to an input of the mixing valve 19. Although only one chemical source 29 is shown in this embodiment, usually, a plurality of different chemicals are provided for connection to the input of the mixing valve 19. One chemical source 29 is illustrated in this embodiment for simplicity of description. The chemical source 29 supplies a mixture of sulfuric acid and hydrogen peroxide solution, for example.

A drain pipe 31 branches from the circuit 17 upstream of the mixing valve 19. The drain pipe 31 has a switch valve 33 mounted thereon. By opening this switch valve 33, the treating solution is drained from the outer tank 5 and circuit 17. The inner tank 3 has a drain port 35 formed in the bottom thereof. A drain pipe 37 is connected to the drain port 35, and this pipe 37 has a further switch valve 39 mounted thereon.

The outer tank 5 includes an ultraviolet emitting unit 111 mounted therein. The ultraviolet emitting unit 111 includes UV lamps 113, a reflector 114 for turning ultraviolet light from the UV lamps 113 in one direction only, and a casing 115 enclosing the UV lamps 113 as isolated from the ambient. The ultraviolet emitting unit 111 is supplied with necessary electric power from a lamp power source 117. The ultraviolet light emitted from the respective UV lamps 113, preferably, is in a wavelength range of 100 to 400 nm, for example, to dissolve or decompose easily the photoresist film formed on the wafers W and particles and fragments of the film present in the treating solution.

The substrate treating apparatus having the above construction removes the photoresist film from the wafers W as follows, for example. The switch valves 33 and 39 are closed during a film removing operation.

The treating solution containing sulfuric acid and hydrogen peroxide solution is supplied from the chemical source 29. The pump 21 is operated to supply the treating solution to the inner tank 3 through the circuit 17 and filling pipes 13. The treating solution overflowing the inner tank 3 is collected in the outer tank 5 and returned to the inner tank 3 through the circuit 17. At this time, the in-line heater 23 is operated, as necessary, to heat the treating solution to a predetermined temperature. When the treating solution has reached the predetermined temperature, the wafers W (coated with photoresist film) supported by the holding mechanism 7 are lowered to the treating position inside the inner tank 3. The photoresist film formed on the wafers W is separated therefrom by the treating solution, and mixes in the form of particles and fragments into the treating solution. The treating solution mixed with the particles and fragments of the photoresist film overflows to the outer tank 5, where the particles and fragments of the photoresist film are decomposed by ultraviolet irradiation. Then, the treating solution is supplied again to the inner tank 3 through the circuit 17. Upon lapse of a predetermined time, the switch valve 39 is opened to drain the treating solution from the inner tank 3, and deionized water is supplied from the deionized water source 27 to the inner tank 3 to clean the wafers W of the treating solution adhering thereto.

Thus, since ultraviolet light is emitted from the ultraviolet emitting unit 111 in the outer tank 5, the treating solution flows into the circuit 17 after the particles and fragments of the photoresist film in the treating solution are decomposed. This prevents the filter 25 from becoming clogged with the film particles and fragments. Consequently, the filter 25 may be changed with reduced frequency, to improve the working efficiency of the apparatus.

Embodiment 4

Embodiment 4 of the invention will be described hereinafter with reference to drawings.

Figure 8:
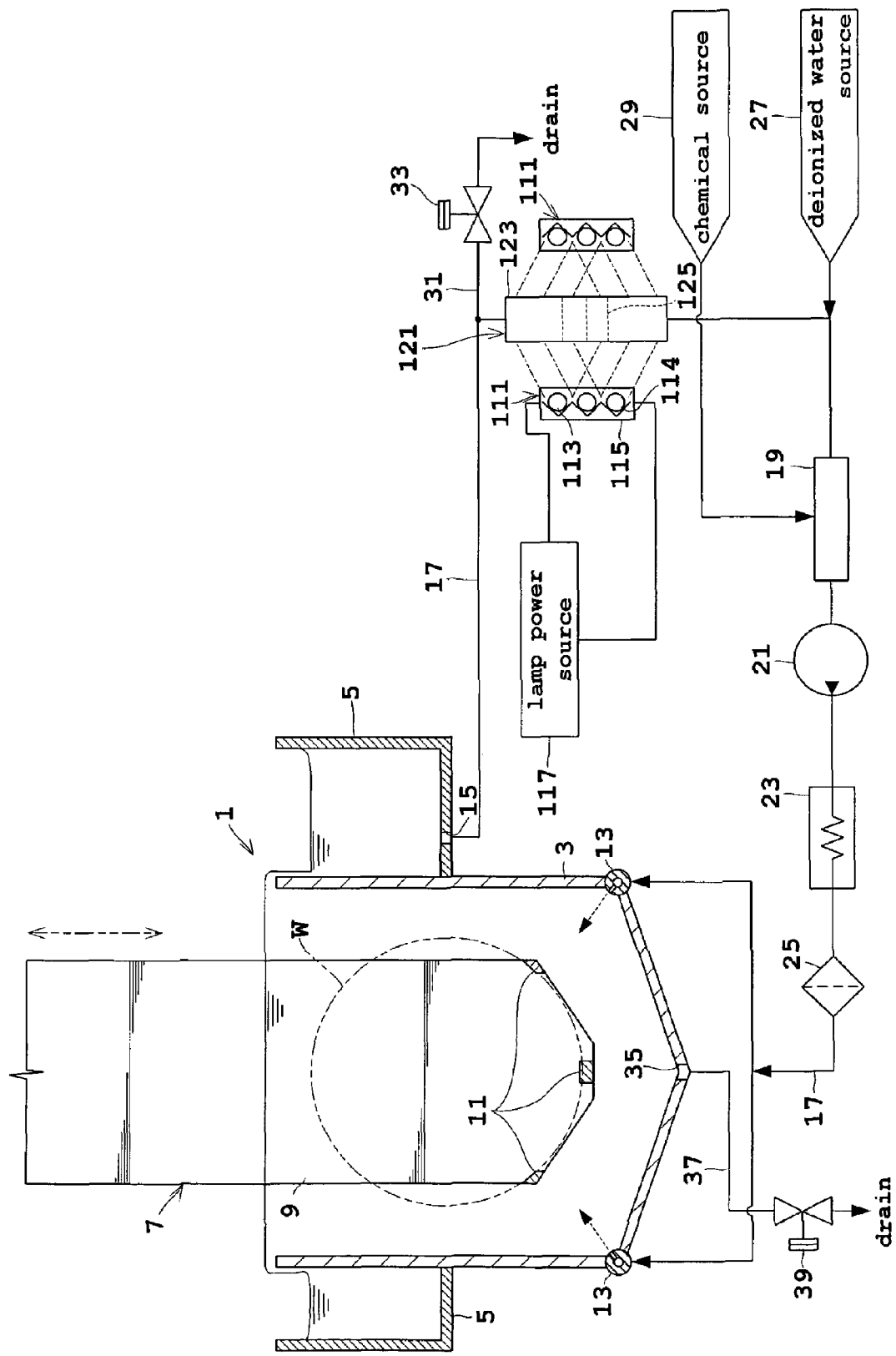
FIG. 8 is a block diagram showing an outline of a substrate treating apparatus in Embodiment 4.
Figure 9:
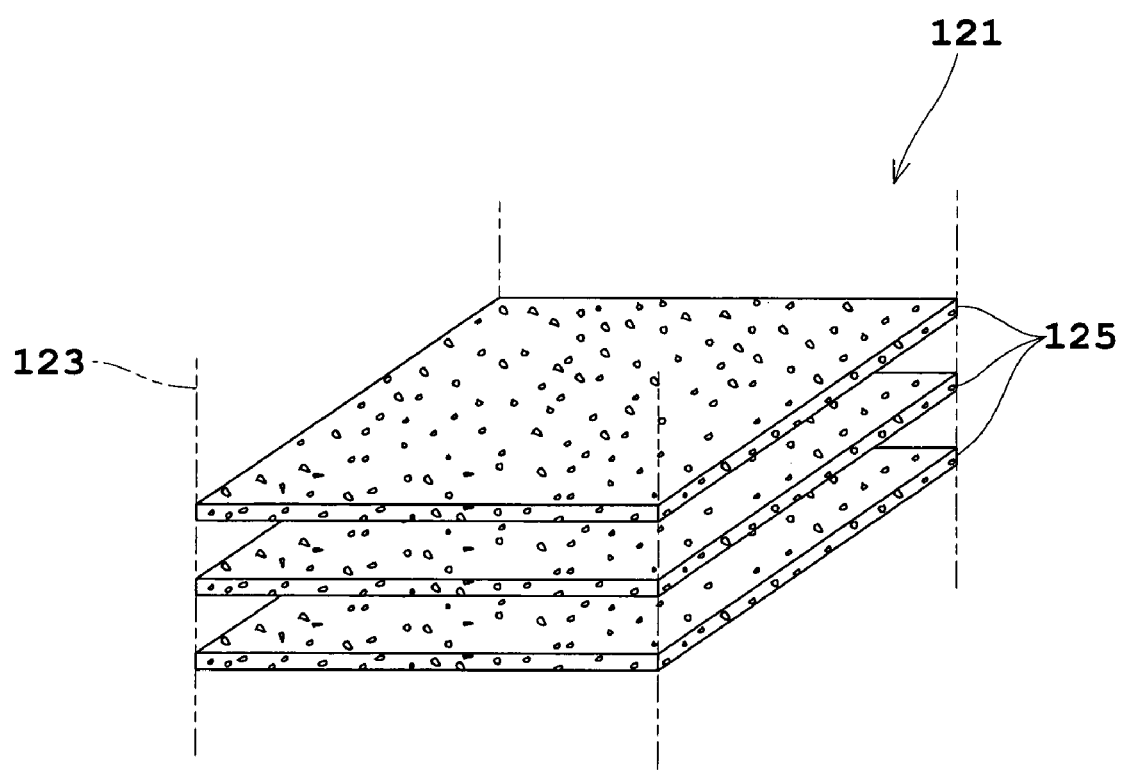
FIG. 9 is a perspective view showing a construction of a mesh pipe.

FIG. 8 is a block diagram showing an outline of a substrate treating apparatus in Embodiment 4. FIG. 9 is a perspective view showing a construction of a mesh pipe. Like reference numerals will be used to identify like parts which are the same as in Embodiment 3, and will not be described again.

In this embodiment, the circuit 17 includes a mesh pipe 121 disposed upstream of the filter 25, between the mixing valve 19 and drain pipe 31. The mesh pipe 121 has a pipe portion 123 formed of a material that transmits ultraviolet light, and meshed plates 125 arranged in the pipe portion 123 and each defining numerous small bores extending from an upper surface to a lower surface thereof. In this example, three meshed plates 125 are arranged in the direction in which the treating solution flows. An ultraviolet emitting unit 111 is arranged around the mesh pipe 125.

The meshed plates 125, which are shaped rectangular here, may have a circular or other shape. The pipe portion 123 and meshed plates 125 are formed of a material that transmits the ultraviolet light emitted from the ultraviolet emitting unit 111.

In this embodiment having the above construction, the meshed plates 125 in the mesh pipe 121 capture the particles and fragments of the photoresist film mixed into the treating solution overflowing the inner tank 3 to the outer tank 5 and flowing into the circuit 17. Since the ultraviolet light from the ultraviolet emitting unit 111 irradiates the meshed plates 125, the particles and fragments of the photoresist film having mixed into the treating solution are decomposed. This prevents the filter 25 from becoming clogged with the film particles and fragments. Consequently, the filter 25 may be changed with reduced frequency, to improve the working efficiency of the apparatus. Since the particles and fragments of the photoresist film mixed in are captured efficiently by the meshed plates 125, the film decomposition efficiency is improved.

A similar effect is produced by replacing the meshed plates 125 with perforated plates each defining numerous small bores extending from an upper surface to a lower surface thereof.

Embodiment 5

Embodiment 5 of the invention will be described hereinafter with reference to FIG. 10 of the drawings.

Figure 10:
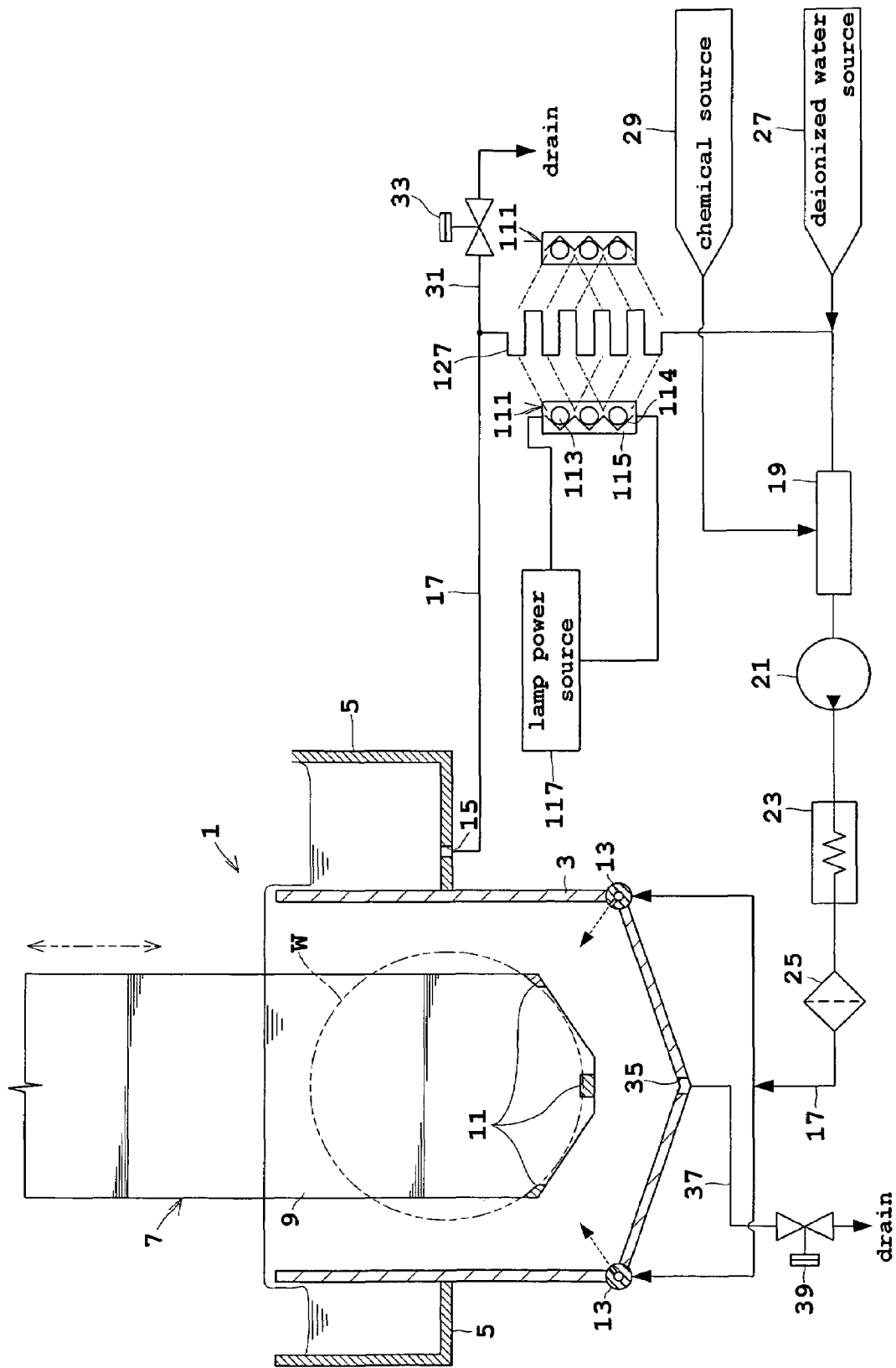
FIG. 10 is a block diagram showing an outline of a substrate treating apparatus in Embodiment 5.

FIG. 10 is a block diagram showing an outline of a substrate treating apparatus in Embodiment 5. Like reference numerals will be used to identify like parts which are the same as in the preceding embodiments, and will not be described again.

In this embodiment, the circuit 17 includes, in the position upstream of the filter 25, between the mixing valve 19 and drain pipe 31, a meandering pipe 127 defining a zigzag channel in place of the mesh pipe 121 in Embodiment 4 described above. The meandering pipe 127 defines an increased effective channel length between the drain pipe 31 and mixing valve 19. An ultraviolet emitting unit 111 is arranged around the meandering pipe 127. The meandering pipe 127 is formed of a material that transmits the ultraviolet light emitted from the ultraviolet emitting unit 111.

In the apparatus in Embodiment 5 having the above construction, by passing the treating solution through the meandering pipe 127 defining an extended channel, ultraviolet light can irradiate the particles and fragments of the photoresist film in the solution over an extended time. Thus, the photoresist film mixed into the treating solution can be decomposed efficiently. This prevents the filter 25 from becoming clogged with the film particles and fragments. Consequently, the filter 25 may be changed with reduced frequency, to improve the working efficiency of the apparatus. The meandering pipe 127 does not greatly increase channel resistance, and has little influence on the flow through the circuit 17.

Embodiment 6

Embodiment 6 of the invention will be described hereinafter with reference to FIG. 11 of the drawings.

Figure 11:
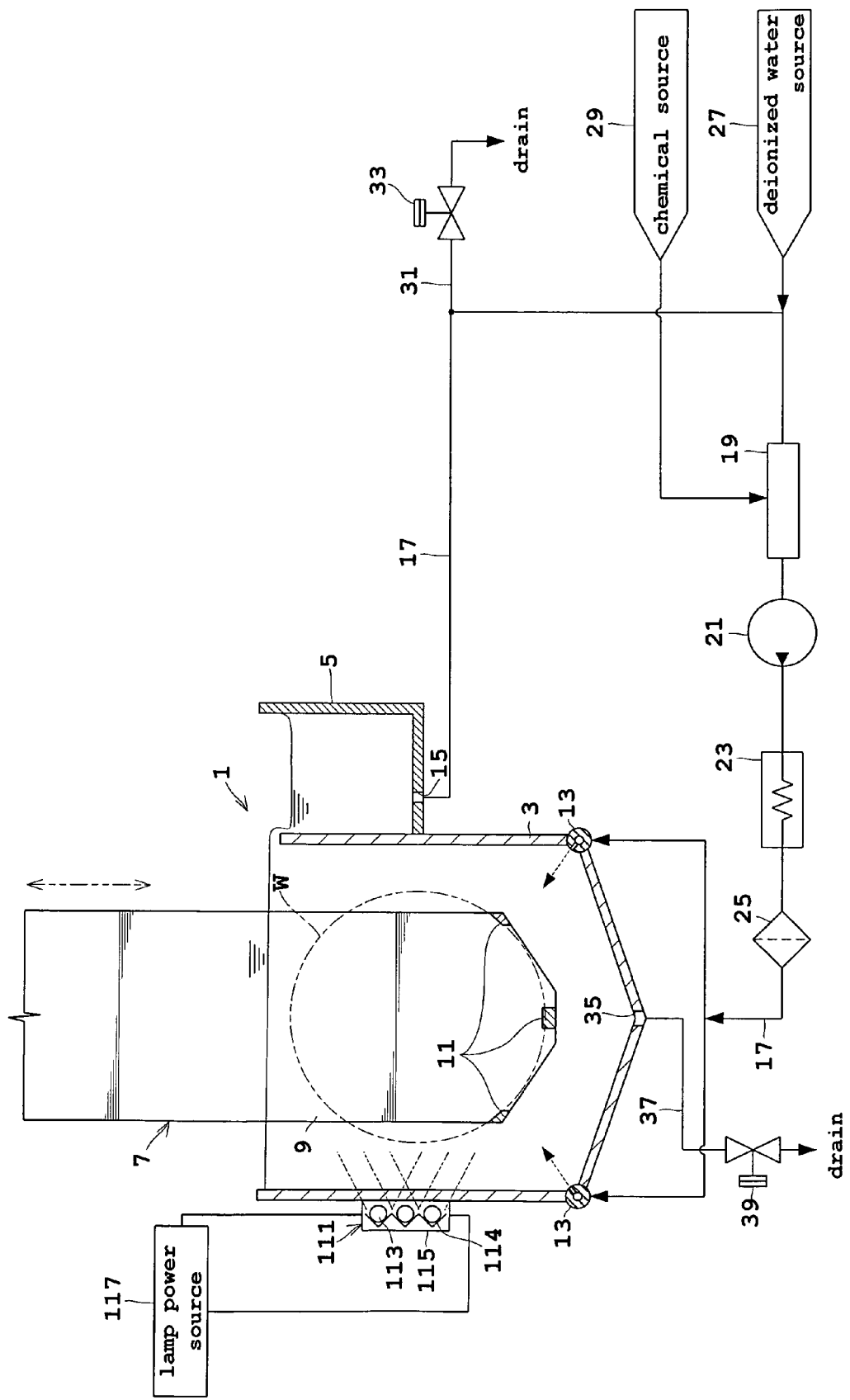
FIG. 11 is a block diagram showing an outline of a substrate treating apparatus in Embodiment 6.

FIG. 11 is a block diagram showing an outline of a substrate treating apparatus in Embodiment 6. Like reference numerals will be used to identify like parts which are the same as in the preceding embodiments, and will not be described again.

The apparatus in this embodiment is different from the apparatus in the preceding embodiments in that this apparatus has an ultraviolet emitting unit 111 attached to the inner tank 3 instead of the outer tank 5 or circuit 17. The ultraviolet emitting unit 111 attached to the inner tank 3 emits ultraviolet light incident from a side of the inner tank 3 to irradiate the treating solution and wafers W stored or placed therein. The side of the inner tank 3 is formed of a material that transmits ultraviolet light. The ultraviolet emitting unit 111 may be disposed not only at the left-hand side of the inner tank 3 but also at the right-hand side and at front and rear sides (with respect to the plane of FIG. 11).

With the above construction, by emitting ultraviolet light to the treating solution in the inner tank 3, the particles and fragments of the photoresist film mixed into the treating solution in the inner tank 3 may be decomposed. This prevents the filter 25 from becoming clogged with the film particles and fragments. Consequently, the filter 25 may be changed with reduced frequency, to improve the working efficiency of the apparatus. Since the wafers W placed in the inner tank 3 are also irradiated with ultraviolet light, not only are the particles and fragments of the photoresist film mixed into the treating solution decomposed, but the irradiation helps to decompose directly the photoresist film coating the wafers W. Thus, the film removing treatment of the wafers W may be carried out in a reduced time.

Embodiment 7

Embodiment 7 of the invention will be described hereinafter with reference to FIG. 12 of the drawings.

Figure 12:
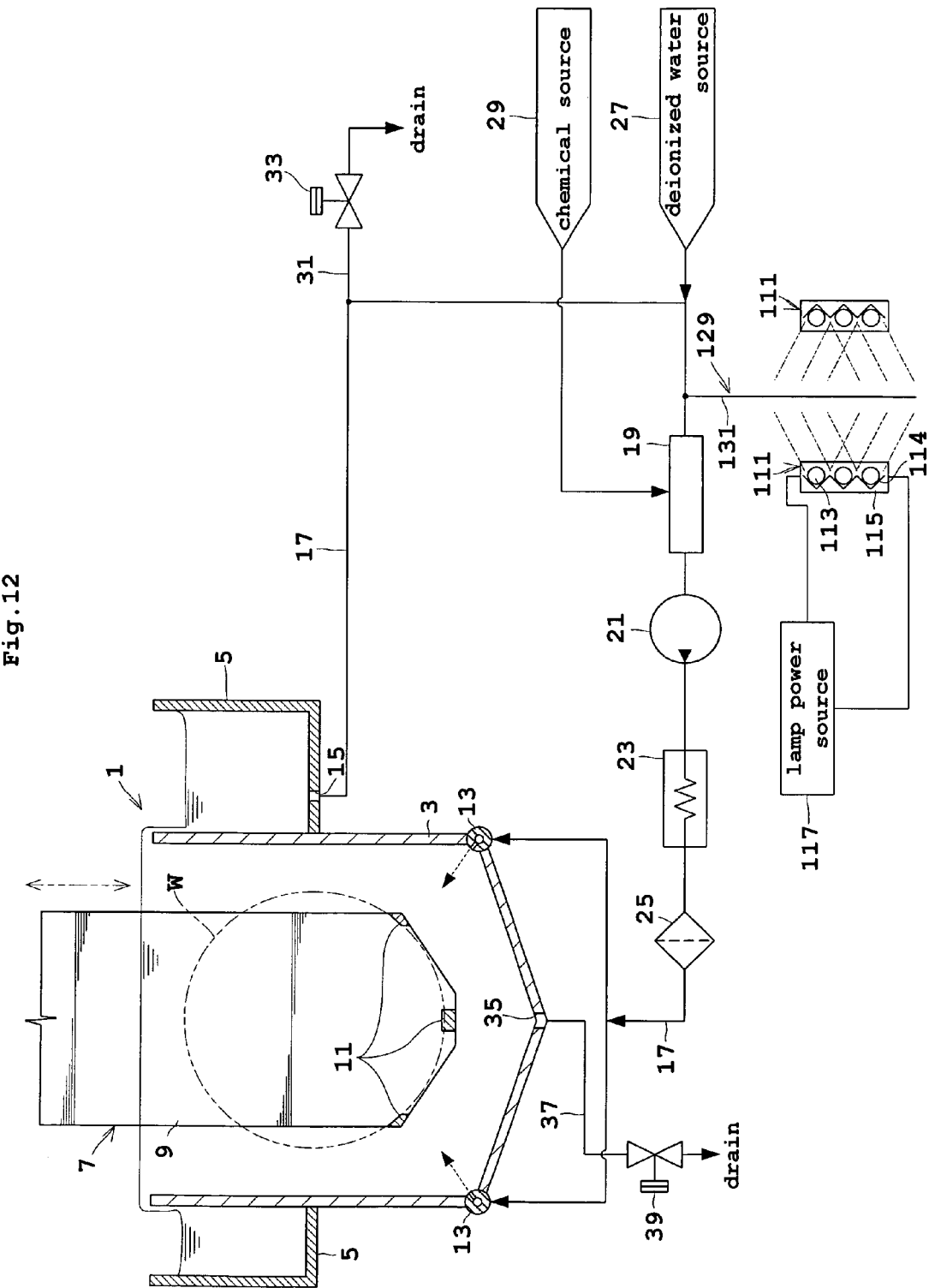
FIG. 12 is a block diagram showing an outline of a substrate treating apparatus in Embodiment 7.

FIG. 12 is a block diagram showing an outline of a substrate treating apparatus in Embodiment 7. Like reference numerals will be used to identify like parts which are the same as in the preceding embodiments, and will not be described again.

This apparatus has a trap device 129 shunted from the channel in the circuit 17 between the drain pipe 31 and mixing valve 19. The trap device 129 includes a trap pipe 131 extending perpendicular to the direction of circulation through the circuit 17. The particles and fragments of the photoresist film in the treating solution flowing through circuit 17 will precipitate in the trap pipe 131.

With this apparatus, the particles and fragments of the photoresist film in the treating solution precipitate to be captured in the trap pipe 131. The film particles and fragments may be decomposed by emitting ultraviolet light to the trap pipe 131. This prevents the filter 25 from becoming clogged with the film particles and fragments. Consequently, the filter 25 may be changed with reduced frequency, to improve the working efficiency of the apparatus. This effect is produced by the simple construction requiring only the trap device 129 provided for the circuit 17.

Figure 13:
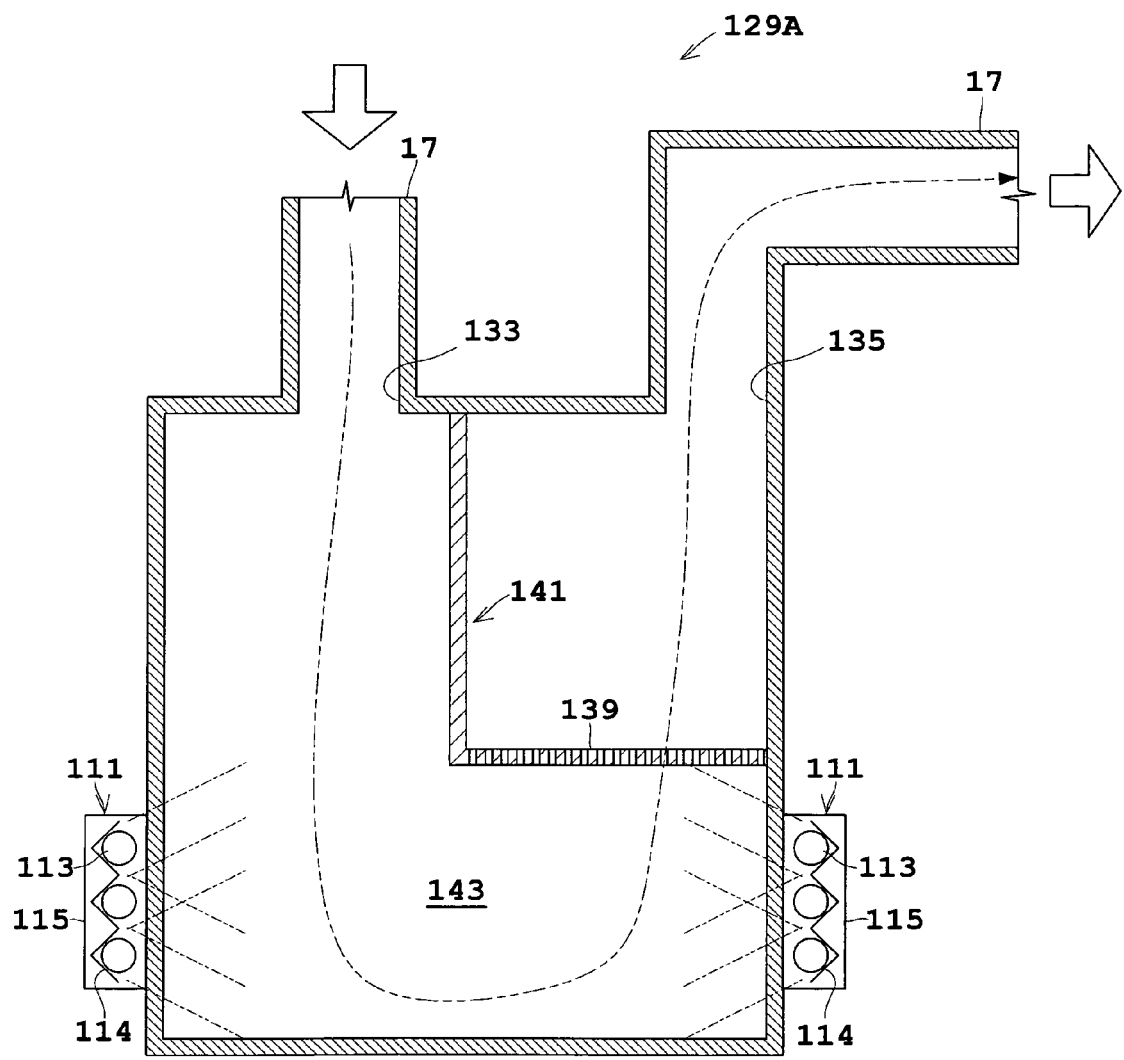
FIG. 13 is a view in vertical section showing a modified construction of a trap device.

The above trap device 129 may be replaced with a trap device 129A as shown in FIG. 13. FIG. 13 is a view in vertical section of the modified trap device 129A.

This trap device 129A includes a storage tank 137 having an inflow portion 133 connected to an upstream side of the circuit 17 and an outflow portion 135 connected to a downstream side of the circuit 17, a partition 141 dividing the inflow portion 133 and outflow portion 135 such that the former has a larger capacity than the latter, and defining meshes 139 in the channel distant from the inflow portion 133, and an irradiated portion 143 disposed below the meshes 139 of the partition 141 and irradiated by ultraviolet light from an ultraviolet emitting unit 111. At least the irradiated portion 143 of the storage tanks 137 is formed of a material that transmits ultraviolet light.

With this construction, when the treating solution flowing into the storage tank 137 via the inflow portion 133 passes through the meshes 139 of the partition 141, the particles and fragments of the photoresist film are captured and settle in the irradiated portion 143. The treating solution filtered through the meshes 139 returns to the circuit 17 via the outflow portion 135. Thus, by emitting ultraviolet light to the irradiated portion 143, the particles and fragments of the photoresist film mixed in the treating solution may be decomposed efficiently.

Figure 14:
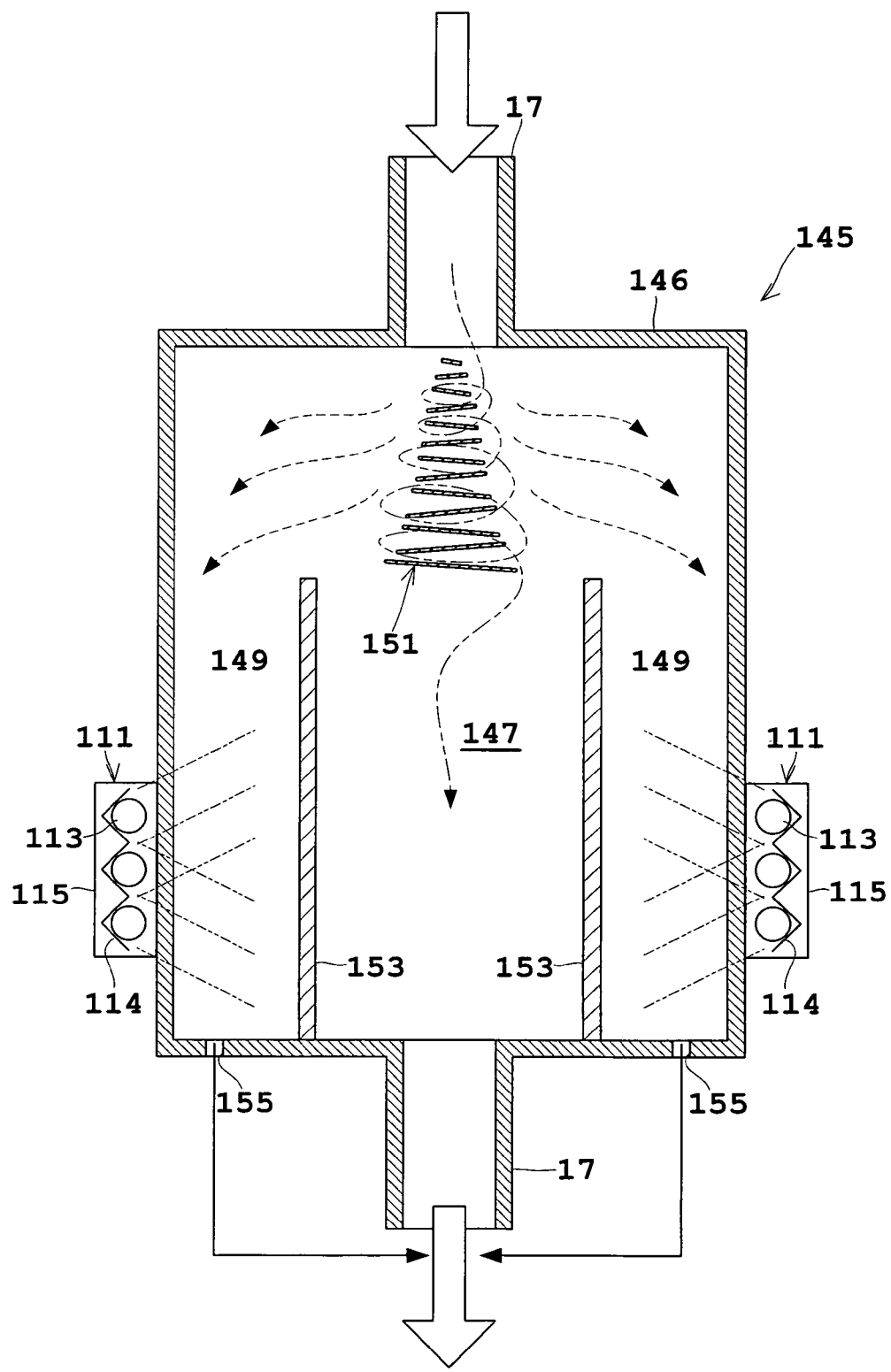
FIG. 14 is a view in vertical section showing a construction of a centrifugal separator.

The circuit 17 may include a construction different from the trap devices 129 and 129A, as described hereinafter. FIG. 14 refers. FIG. 14 is a view in vertical section showing a construction of a centrifugal separator.

A centrifugal separator 145 has, inside a container 146, a central channel 147 communicating with the circuit 17, a storage portion 149 formed around the central channel 147, and a screw coil 151 disposed in an upstream position of the central channel 147. A partition 153 is erected between the central channel 147 and storage portion 149. The partition 153 has an upper end thereof located at a fixed distance to the lower surface of the container 146. A drain port 155 is formed in the bottom of the storage portion 149. The drain port 155 is connected to the circuit 17 in a position downstream of the centrifugal separator 145.

In the above centrifugal separator 145, as the treating solution passes through the screw coil 151, a large part of the treating solution flows through the central channel 147 as shown in a two-dot chain line arrow, and the particles and fragments of the photoresist film in the treating solution are diverted from the central channel 147 into the storage portion 149 as shown in dotted line arrows. The film particles and fragments stagnating in the storage portion 149 are decomposed by the ultraviolet light from the ultraviolet emitting unit 111. The treating solution is returned to the circuit 17 through the drain port 155. Thus, this relatively simple construction can relatively accurately separate and decompose the particles and fragments of the photoresist film mixed in the treating solution.

Figure 15:
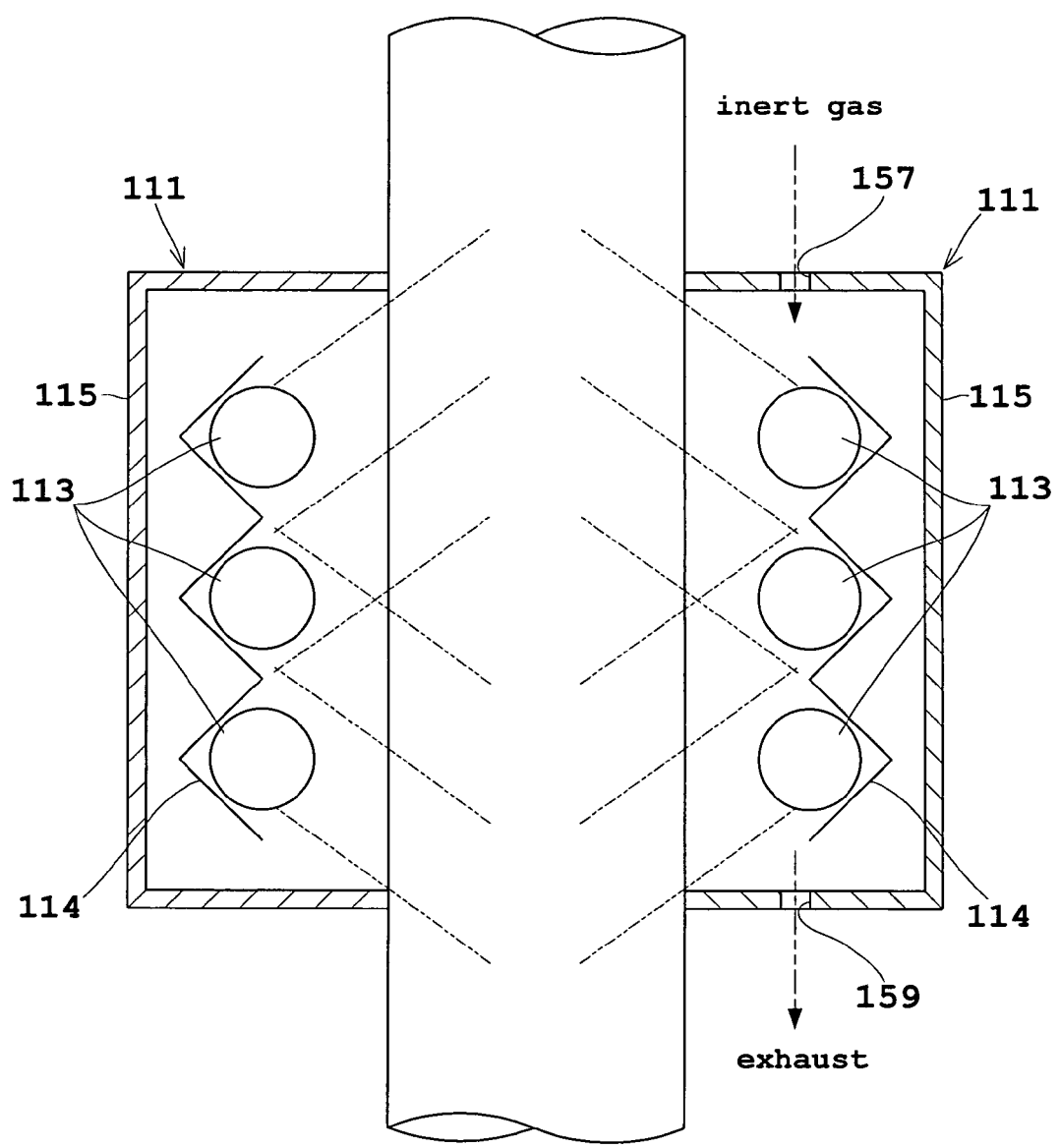
FIG. 15 is a view in vertical section showing a construction of an ultraviolet emitting unit.

The ultraviolet emitting units 111 used in the embodiments and modifications described above, preferably, are constructed as follows. FIG. 15 refers. FIG. 15 is a view in vertical section showing a construction of an ultraviolet emitting unit.

An ultraviolet emitting unit 111 includes a casing 115 having an inlet 157 formed in one end wall thereof for introducing inert gas, and an exhaust port 159 formed in the other end wall for exhausting internal gas. The inert gas may be nitrogen gas, for example.

This construction can remove ozone generated by emitting ultraviolet light in atmospheric condition, thereby avoiding adverse influences of ozone on personnel.

This invention is not limited to the foregoing embodiments, but may be modified as follows:

(1) In each embodiment described above, the treating solution contains sulfuric acid and hydrogen peroxide solution. This invention is applicable also to the case of using a treating solution containing an organic solvent instead. The treatment may be etching or cleaning of substrate surfaces, for example.

(2) In each embodiment described above, treatment is performed for wafers W coated with photoresist film. This invention is applicable also to apparatus for treating wafers W having various other coatings than photoresist film.

(3) While the embodiments have been described by taking circular wafers W for example, the invention is applicable also to treatment of rectangular substrates.

This invention may be embodied in other specific forms without departing from the spirit or essential attributes thereof and, accordingly, reference should be made to the appended claims, rather than to the foregoing specification, as indicating the scope of the invention.

What is claimed is:

1. A substrate treating apparatus for treating substrates having a film coating, comprising:
   a treating unit for treating the substrates with a treating solution;
   a drain pipe for draining the treating solution from said treating unit;
   a filter mounted on said drain pipe, said filter including a filter body having a hollow portion, an outer container surrounding said filter body, an inflow portion for admitting the treating solution at an end of said outer container, and an outflow portion communicating with said hollow portion of said filter body and for discharging the treating solution from the other end of said outer container; and
   ultraviolet emitting unit for the filter for emitting ultraviolet light to the treating solution flowing through said filter, said ultraviolet emitting unit being disposed in one of positions between said outer container and said filter body and in said hollow portion of said filter body.

2. A substrate treating apparatus as defined in claim 1, wherein said ultraviolet emitting unit for the filter is further disposed in the other of the positions between said outer container and said filter body and in said hollow portion of said filter body.

3. A substrate treating apparatus for treating substrates having a film coating, comprising:
   a treating unit for treating the substrates with a treating solution;
   a drain pipe for draining the treating solution from said treating unit;
   a filter mounted on said drain pipe;
   ultraviolet emitting unit for the filter for emitting ultraviolet light to the treating solution flowing through said filter; and
   a pump for feeding the treating solution under pressure to said treating unit, said pump including ultraviolet emitting unit for the pump for emitting ultraviolet light to the treating solution flowing through said pump.

4. A substrate treating apparatus as defined in claim 3, wherein said pump is a bellows pump, said ultraviolet emitting unit for the pump being disposed in an inflow portion and an outflow portion of said pump.

5. A substrate treating apparatus for treating substrates having a film coating, comprising:
   a treating unit for treating the substrates with a treating solution;
   a drain pipe for draining the treating solution from said treating unit;
   a filter mounted on said drain pipe;
   ultraviolet emitting unit for the filter for emitting ultraviolet light to the treating solution flowing through said filter; and
   heating device for heating the treating solution to be supplied to said treating unit to a predetermined temperature, said heating unit including ultraviolet emitting unit for the heating device for emitting ultraviolet light to the treating solution flowing through said heating device.

6. A substrate treating apparatus as defined in claim 5, wherein said heating device includes a plurality of heat lamps, at least one of said heat lamps being an ultraviolet emitting lamp.

7. A substrate treating apparatus for treating substrates having a film coating, comprising:
- an inner tank for storing a treating solution and allowing the substrates to be immersed in the treating solution;
- an outer tank disposed outside said inner tank for collecting the treating solution overflowing said inner tank;
- a circuit for supplying the treating solution drained from said outer tank to said inner tank;
- a filter mounted on said circuit;
- a mesh pipe disposed upstream of said filter on said circuit; and ultraviolet emitting unit for emitting ultraviolet light to the treating solution into said mesh pipe.

8. A substrate treating apparatus as defined in claim 7, wherein said mesh pipe includes a plurality of meshed plates arranged in a flowing direction of the treating solution, said ultraviolet emitting unit being disposed around said mesh pipe.

9. A substrate treating apparatus for treating substrates having a film coating, comprising:
- an inner tank for storing a treating solution and allowing the substrates to be immersed in the treating solution;
- an outer tank disposed outside said inner tank for collecting the treating solution overflowing said inner tank;
- a circuit for supplying the treating solution drained from said outer tank to said inner tank;
- a filter mounted on said circuit;
- a meandering pipe disposed upstream of said filter on said circuit; and
- ultraviolet emitting unit for emitting ultraviolet light to the treating solution in said meandering pipe.

10. A substrate treating apparatus for treating substrates having a film coating, comprising:
- an inner tank for storing a treating solution and allowing the substrates to be immersed in the treating solution;
- an outer tank disposed outside said inner tank for collecting the treating solution overflowing said inner tank;
- a circuit for supplying the treating solution drained from said outer tank to said inner tank;
- a filter mounted on said circuit;
- a trap pipe connected to a position thereof upstream of said filter on said circuit; and
- ultraviolet emitting unit emitting ultraviolet light to the treating solution in said trap pipe.

11. A substrate treating apparatus for treating substrates having a film coating, comprising:
- an inner tank for storing a treating solution and allowing the substrates to be immersed in the treating solution;
- an outer tank disposed outside said inner tank for collecting the treating solution overflowing said inner tank;
- a circuit for supplying the treating solution drained from said outer tank to said inner tank;
- a filter mounted on said circuit;
- trap unit disposed upstream of said filter on said circuit, said trap unit including a storage tank for storing the treating solution, said storage tank having an inflow portion connected to an upstream position of said circuit, and an outflow portion connected to a downstream position of said circuit; and
- ultraviolet emitting unit for emitting ultraviolet light to the treating solution in said trap unit.

12. A substrate treating apparatus as defined in claim 11, wherein said trap unit further includes a partition dividing said inflow portion and said outflow portion such that said inflow portion has a larger capacity than said outflow portion, and defining meshes in a channel distant from said inflow portion, and an irradiated portion disposed below said meshes of said partition and irradiated by ultraviolet light from said ultraviolet emitting unit.

13. A substrate treating apparatus for treating substrates having a film coating, comprising:
- an inner tank for storing a treating solution and allowing the substrates to be immersed in the treating solution;
- an outer tank disposed outside said inner tank for collecting the treating solution overflowing said inner tank;
- a circuit for supplying the treating solution drained from said outer tank to said inner tank;
- a filter mounted on said circuit; and
- a centrifugal separator disposed upstream of said filter for centrifugally separating the treating solution; and
- ultraviolet emitting unit for emitting ultraviolet light to the treating solution in said centrifugal separator.

14. A substrate treating apparatus as defined in claim 13, wherein said centrifugal separator includes a container, a central channel formed in said container and communicating with said circuit, a storage portion formed around said central channel, and a screw coil disposed in an upstream position of said central channel.

15. A substrate treating apparatus for treating substrates having a film coating, comprising:
- an inner tank for storing a treating solution and allowing the substrates to be immersed in the treating solution;
- an outer tank disposed outside said inner tank for collecting the treating solution overflowing said inner tank;
- a circuit for supplying the treating solution drained from said outer tank to said inner tank;
- a filter mounted on said circuit; and
- ultraviolet emitting unit for emitting ultraviolet light to the treating solution,
- said ultraviolet emitting unit includes UV lamps, a casing enclosing, and shielding from environment, said UV lamps and an area irradiated by ultraviolet light, an inlet for introducing inert gas to one end of said casing, and an exhaust port for exhausting internal gas from the other end of said casing.

16. A substrate treating apparatus for treating substrates having a film coating, comprising:
- an inner tank for storing a treating solution and allowing the substrates to be immersed in the treating solution;
- an outer tank disposed outside said inner tank for collecting the treating solution overflowing said inner tank;
- a circuit for supplying the treating solution drained from said outer tank to said inner tank;
- a filter mounted on said circuit; and
- an ultraviolet emitting unit for emitting ultraviolet light to the treating solution,
- wherein said ultraviolet emitting unit is provided for said outer tank for emitting ultraviolet light to the treating solution overflowing to said outer tank; and
- wherein said ultraviolet emitting unit includes UV lamps, a casing enclosing, and shielding from environment, said UV lamps and an area irradiated by ultraviolet light, an inlet for introducing inert gas to one end of said casing, and an exhaust port for exhausting internal gas from the other end of said casing.

* * * * *